United States Patent [19]

Hopwood et al.

[11] Patent Number: 5,155,492
[45] Date of Patent: Oct. 13, 1992

[54] DUAL MODE ACTIVE APERTURE

[75] Inventors: Francis W. Hopwood, Severna Park; Jerry A. Kane, Crofton; Thomas R. Turlington, Linthicum; David S. Oros, Owings Mills, all of Md.

[73] Assignee: Westinghouse Electric Corp., Pittsburgh, Pa.

[21] Appl. No.: 706,664

[22] Filed: May 29, 1991

[51] Int. Cl.[5] .................... H01Q 3/22; H01Q 3/24; H01Q 3/26
[52] U.S. Cl. .................................................. 342/372
[58] Field of Search ................ 342/14, 17, 82, 83, 342/120, 372

[56] References Cited

U.S. PATENT DOCUMENTS

| 4,517,568 | 5/1985 | Willmore | 342/368 |
| 4,758,839 | 7/1988 | Goebel et al. | 342/132 |
| 4,958,161 | 9/1990 | Allezard | 342/122 |

Primary Examiner—Theodore M. Blum
Attorney, Agent, or Firm—W. G. Sutcliff

[57] ABSTRACT

A dual mode active aperture phased array system for pulsed radar and continuous wave applications. The system may be switched between the two modes without appreciable loss of average effective radiated power. Both the voltage and current of the biasing power to the amplifying transistors is varied to accommodate the difference in peak amplitude power while maintaining the optimum average effective radiated power. The DC power supply is a chopper.

26 Claims, 3 Drawing Sheets

RADAR PULSES
HIGH PEAK POWER
LOW DUTY

ECM WAVEFORM
LOW PEAK POWER
CONTINUOUS

DUAL MODE ACTIVE APERTURE

BACKGROUND OF THE INVENTION

1. Field of Invention

The present invention relates to a dual mode radar system with an active aperture phased array antenna; and more particularly, to such a dual mode system utilizing a solid state active aperture phased array antenna system and related method. Although suitable for the transmission of radiant energy having different average and peak power, the antenna system of the present invention is particularly advantageous for dual mode operation where radar pulses and a continuous wave (CW) are transmitted alternately by the same antenna, and will be described in connection therewith.

2. Discussion of Related Art

A phased array antenna is made up of a multitude of individual radiating elements which are excited from a common signal source to maintain phase coherence. A beam is formed from the superposition of the radiation by each of the individual elements. As is well known, by changing the phase of the signal applied to each element the direction of the beam is varied.

Phased array antennas may be either of the passive aperture type or the active aperture type. In passive aperture arrays, each radiating element merely includes phase shifters for changing passively the microwave energy. In active aperture arrays, each radiating element includes an associated solid state module having a power amplifier stage for amplifying the microwave energy, preferably subsequent to phase shifting. Active aperture solid state antennas are advantageous in that they permit the forming of a high power beam by power combining in free space a large number of low power beams; and are also advantageous for multi-mode operation; that is, where the same radiation elements of the antenna array are used for different types or modes of transmission and reception. Multi-mode operation, of course, minimizes the number of microwave apertures and radiating elements required, by permitting the use of the same aperture for more than one function.

In multi-mode operation, it is often desirable to operate in a manner that includes both pulsed radar and continuous wave (CW) electronic countermeasure modes, for example. However, as far as is known, prior to the present invention, it was not possible to optimize the active apertures for both the pulsed radar and continuous wave modes because of the widely different duty cycles of their waveform. The active microwave elements or amplifiers tend to be peak power limited, while the power sources tend to be average power limited.

This situation required that one of two compromises be observed when both operating modes must be served. One compromise involved providing microwave modules and a power supply having the capacity to operate all of the antenna elements at the required power in the CW mode, thus providing maximum Average Effective Radiated Power (AERP) for the CW electronic countermeasure operation. For the pulsed mode, the AERP was then necessarily reduced to a fraction of the AERP in the CW mode, corresponding to the duty cycle of the pulsed mode. Thus, for a pulsed mode having a typical duty cycle of twenty-five percent, the AERP is reduced to twenty-five percent of the AERP in the CW mode. For the other compromise, microwave modules and a power supply were utilized that had the capacity to operate at maximum AERP in the pulsed radar mode; and then for (CW) operation, because of the average power limitation of the power source, only a fraction of the total available individual elements were energized. Although this compromise provided the same average radiated power for both modes, the usable aperture of the antenna was reduced by a percentage corresponding to the number of deenergized elements. This, of course, reduced the Actual Average Effective Radiated Power (AERP) for the CW mode below that of the pulsed radar mode. Therefore, depending upon which compromise situation was used, a significantly less AERP was available for either the pulsed radar or CW mode.

SUMMARY OF THE INVENTION

One of the advantages of the present invention is the optimization of the Average Effective Radiated Power for both modes in the dual mode operation of a solid state active aperture phased array antenna system and related method.

Additional advantages of the present invention will be set forth in part in the description which follows, and in part will be obvious from the description, or may be learned by practice of the invention. The advantages of the invention may be realized and attained by means of the instrumentalities and combinations particularly pointed out in the appended claims.

To achieve the advantages and in accordance with the purpose of the dual mode system, as embodied and broadly described herein, the present invention comprises a phased array antenna having a plurality of active apertures; RF signal generating means connected to apply at least two modes of radiant energy signals to the active apertures, at least two of the at least two modes having different peak power and duty cycle requirements; a solid state power amplifier for each of the plurality of active apertures for amplifying the generated RF signals; a variable DC power source for supplying power to each of the power amplifiers; mode control means for operating the signal generating means to generate selectively RF signals corresponding to each of the at least two modes; and power amplifier control means governed by the mode control means for controlling the variable DC power source to operate each power amplifier to output RF power having a predetermined first peak amplitude with a predetermined first average effective radiated power during one of the at least two modes, and having a predetermined second peak amplitude different from the first peak amplitude with a second average effective radiated power substantially the same as the first average effective radiated power during the other of the at least two modes.

In another aspect, as embodied and broadly described herein the invention is a method of optimizing the average effective radiated power of a solid state phased array antenna for both modes of a multi-mode radar system wherein each active aperture includes a power amplifier. The method comprises applying selectively at least two modes of RF signals to the active apertures, at least two of the at least two modes having different peak power requirements; controlling DC power to each power amplifier for operating each power amplifier to output RF power having a predetermined first peak power amplitude with a first average effective radiated power during one of the at least two modes; and controlling the DC power to each power amplifier to operate each power amplifier to output a second peak power amplitude different than the first peak amplitude with a second average effective radiated power substantially the same as the first average effective radiated power during the other of the at least two modes.

The accompanying drawings, which are incorporated in and constitute a part of this specification, illustrate one embodiment of the invention, and together with the description, serve to explain the principles of the invention.

DESCRIPTION OF THE PREFERRED EMBODIMENT

Reference will now be made in detail to the present preferred embodiment of the invention, an example of which is illustrated in the accompanying drawings.

Figure 1:
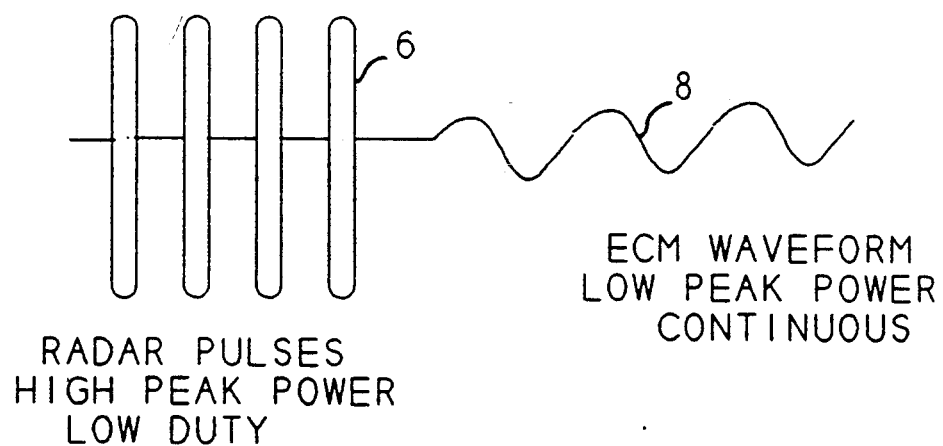
FIG. 1 is a diagram of an exemplary waveform of generated RF output signals when operating the system of FIG. 1 in the dual mode.
Figure 2:
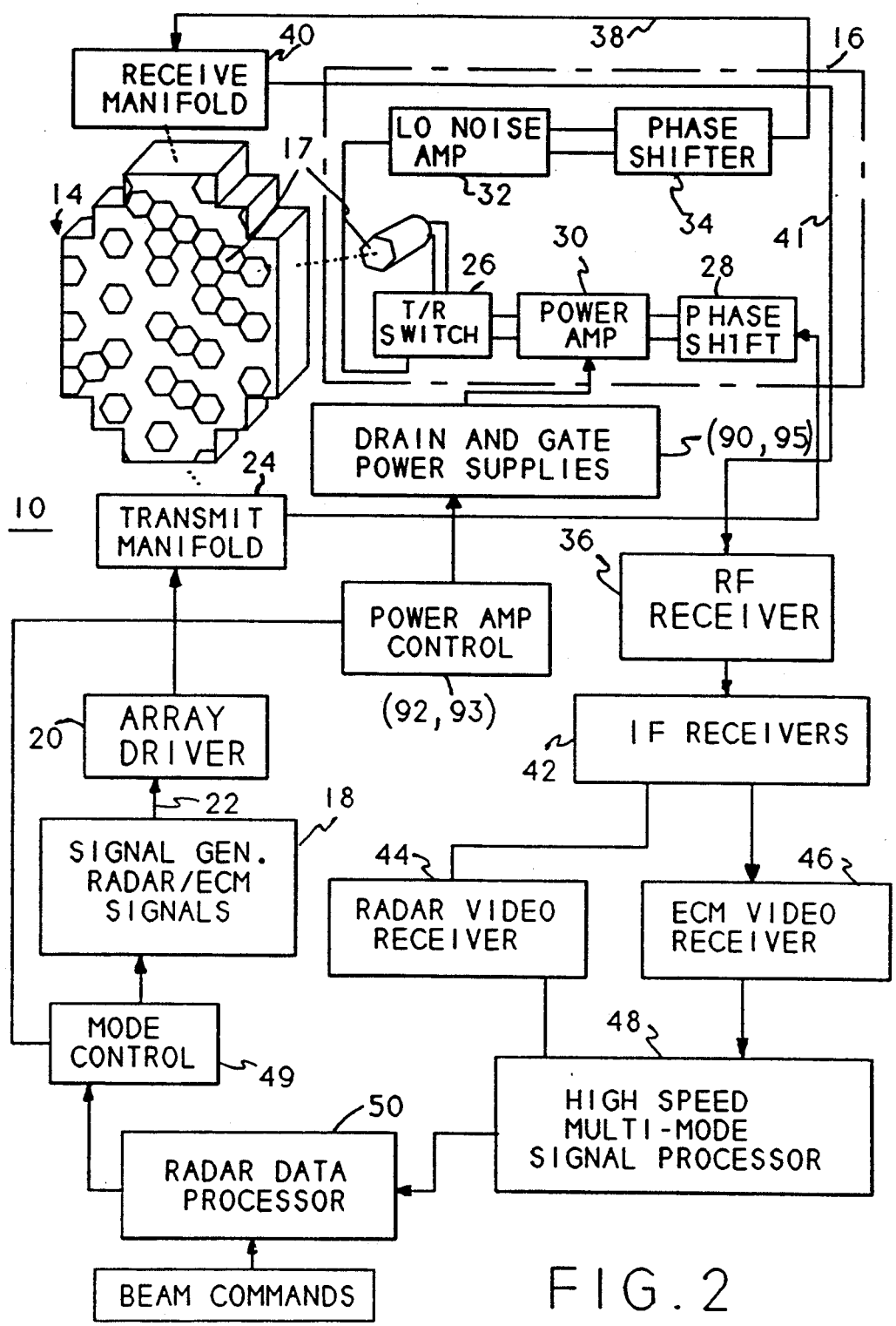
FIG. 2 is a block diagram of a dual mode system for operating in pulsed radar and continuous wave modes incorporating the principles of the present invention.

A dual mode radar system generally referred to as 10 which incorporates the principles of the present invention is illustrated schematically in FIG. 2. Dual mode radar system 10 comprises a phased array antenna having a plurality of active apertures, and RF signal generating means connected to apply at least two modes of radiant energy signals to the active apertures, each of the at least two modes having different peak power and duty cycle requirements. As shown in FIG. 1, the dual mode radar system outputs alternately radar pulses represented by line portion 6 having high peak power and low duty, and a continuous waveform represented by line 8 which has a low peak power.

As herein embodied, and referring to FIG. 2 the dual mode radar system 10 has a phased array antenna 14 with a plurality of active apertures 16 having one or more radiating elements 17. The antenna system further comprises an RF signal generator 18 for generating in the alternative both pulsed radar and continuous wave ECM signals. The antenna system includes an array driver 20 connected at output 22 of signal generator 18, which in turn is connected to transmit manifold 24 of antenna 14.

Each active aperture 16 in the system of the present invention may include a conventional transmit/receive (T/R) switch 26 which controls the activation and deactivation of the appropriate elements during the transmit and receive cycles of the system. For the transmit cycle a phase shifter 28 is connected to an output of array driver 20, which is output to a power amplifier 30, which in turn feeds radiating element 17 through T/R switch 26. For the receive cycle, the T/R module feeds a low noise amplifier 32 connected to a phase shifter 34. Each phase shifter 34 is connected to a receiver 36 of the radar system over line 38, receive manifold 40 of antenna 14 and line 41. RF receiver 36 is connected to IF receiver 42, which in turn is connected to a radar video receiver 44, and an ECM video receiver 46. Receivers 44 and 46 are connected to a multimode signal processor 48. Beam commands are input to a radar data processor 50 connected to the output of processor 48.

Figure 3:
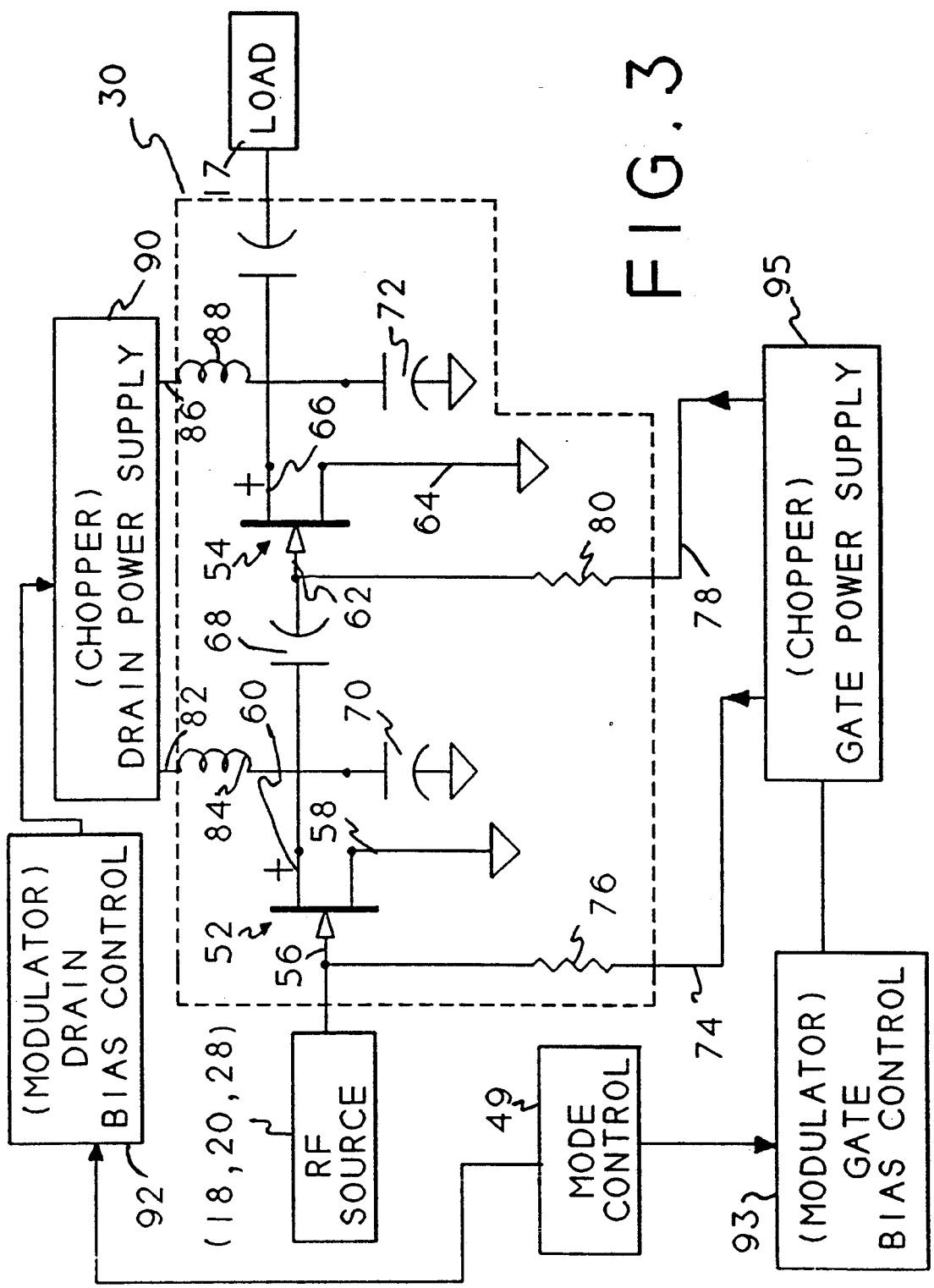
FIG. 3 is a schematic diagram of the power amplifier of FIG. 2 in accordance with one embodiment of the present invention.

Each power amplifier 30 of the system and method of the present invention is a solid state power amplifier for amplifying the generated RF signals. Each power amplifier 30 includes at least one amplifying transistor having gate, source, and drain terminals. As herein embodied and referring to FIG. 3, power amplifier 30 includes field effect transistors 52 and 54. Transistor 52 has a gate 56, a source 58, and a drain 60. Transistor 54 has a gate 62, a source 64, and a drain 66. Gate 56 of transistor 52 is connected to receive RF energy from signal generator 18 through array driver 20 and phase shifter 28. Drain 60 of transistor 52 is coupled to gate 62 of transistor 54 through capacitor 68. Drain 66 of transistor 54 is connected to a load such as radiating element 17. Drain 60 of transistor 52 is also connected to ground through a capacitor 70; and drain 66 of transistor 54 is also connected to ground through capacitor 72.

Gate 56 of transistor 52 is biased over a line 74 through a resistor 76; and gate 62 of transistor 54 is biased over a line 78 through a resistor 80. Drain 60 of transistor 52 is biased over line 82 through a choke coil 84; and drain 66 of transistor 54 is biased over line 86 through choke coil 88. Silicon or gallium arsenide solid state devices are commonly used, depending on the particular microwave frequency of the system. Transistor amplifiers 52 and 54 are preferably operated in Class A or A-B mode, but such operation or mode is not a prerequisite to obtaining the advantages of the present invention.

In accordance with the present invention, a variable DC power supply is provided for supplying power to each of the power amplifiers. As herein embodied, and referring to FIG. 2, a variable drain and gate power supply, referred to as 90, 95, is common to the drains and gates, respectively, of all power amplifiers 30 of all active apertures 16. Drain power supply 90 supplies biasing power to drains 60 and 66 (FIG. 3) through respective choke coils 84 and 88. Gate power supply 95 supplies biasing power to gates 56 and 62 through resistors 76 and 80, respectively. Drain power supply 90 and gate power supply 95 are preferably well known devices commonly known as a "chopper power supply" where the DC output voltage is regulated by chopping the DC input voltage at an ultrasonic frequency, for example, and rectifying the resulting AC output.

The system and method of the present invention includes mode control means (see FIG. 2) for operating the signal generating means to generate selectively RF signals corresponding alternately to each of the at least two modes. As herein embodied, a mode control device 49 switches signal generator 18 alternately to the pulsed radar and CW modes in a well known manner as shown graphically in FIG. 1. When operating in both modes, the mode control means typically alternates between the modes at one second intervals or as required by the particular application.

In accordance with the present invention, a power amplifier control means is governed by the mode control means for controlling the variable DC power supply to operate each power amplifier to output RF power having a predetermined first peak amplitude with a predetermined first average effective radiated power during one of the at least two modes, and having a predetermined second peak amplitude different from the first peak amplitude with a second average effective radiated power substantially the same as the first average effective radiated power during the other of the at least two modes.

In accordance with the present invention, a power amplifier control means includes a first bias control means for controlling the variable DC power source to bias each said drain with a first voltage and current, each having a first predetermined amplitude during one of the at least two modes, and each having a second predetermined amplitude different from the first predetermined amplitude during the other of the at least two modes; and second bias control means for controlling the DC power source to bias each gate with a second voltage and current, each having a first amplitude during one of the at least two modes; and each having a second amplitude different from the first amplitude during the other of the at least two modes.

The present invention controls peak power while maintaining the best efficiency. The drain of the transistors is presented with a microwave load impedance whose value is determined by the circuits in which the device is imbedded. This load impedance is not readily changed; and is assumed to remain constant. Thus, to control the output power, values are established for the drain voltage and drain current. To maintain good efficiency, the ratio of the drain voltage and current must remain constant. Thus, the drain voltage is changed directly by the drain power supply; and the drain current is changed by changing the gate voltage, which establishes the drain current.

As herein embodied, power amplifier control 92, 93, comprises a drain bias control 92 (FIG. 3) connected to drain power supply 90 for controlling the biasing power to drains 60 and 66. A gate bias control 93 is connected to gate power supply 95 for controlling the biasing power to gates 56 and 62. Power regulation by drain bias control 92 and gate bias control 93 is accomplished by modifying the chopped waveform, such as by pulse width modulation, for example. Such a preferred control or regulator is suitable for converting a DC voltage at one level to a DC voltage at another level without appreciable loss of efficiency, and is commonly referred to as a DC to DC converter.

Figure 4:
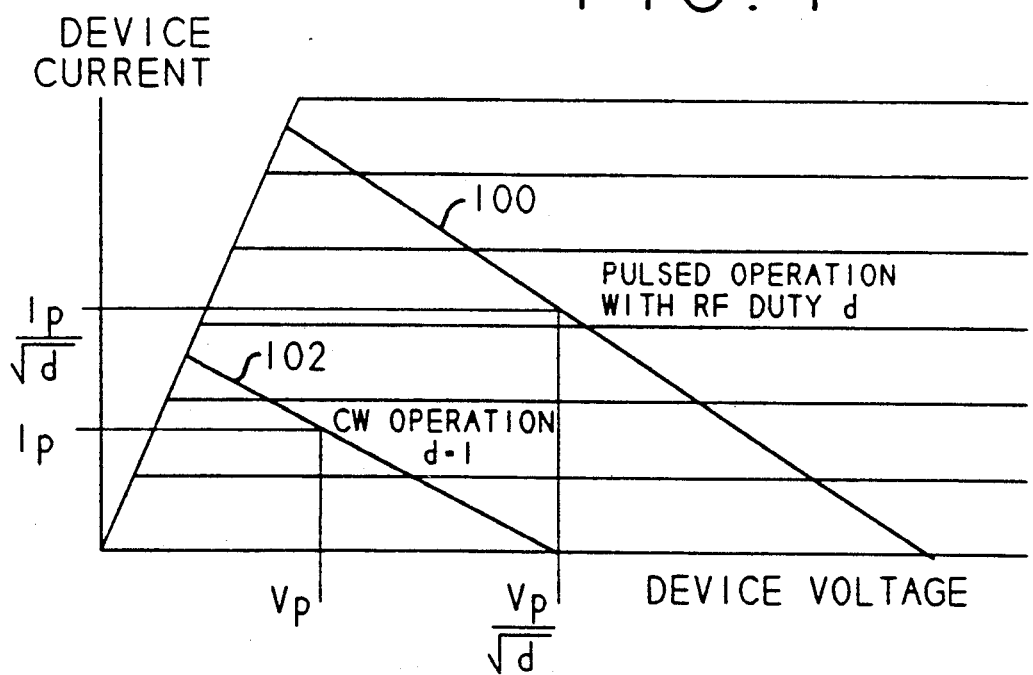
FIG. 4 is a graphic illustration of the optimized pulsed radar and continuous wave power output of the dual mode active aperture phased array antenna system of the present invention.

In describing the principles of the present invention, the following explanation is made in connection with FIG. 4. Power generating devices, such as amplifier 30 are supplied by drain power supply 90 with a DC voltage referred to as Vp and current referred to as Ip. Ideally, without compensating for losses, the available CW generated power for the supplied DC power Vp*Ip equals Vp*Ip/2 because power=RMS voltage x RMS current; thus $$\frac{Vp}{\sqrt{2}} \times \frac{Ip}{\sqrt{2}} = \frac{VpIp}{2}$$

Actual efficiencies are less, and depend on frequency of the signal, the characteristics of the particular device, and the circuit in which it is embedded. In the pulsed radar mode with a duty cycle (d), the drain voltage is increased to $$\frac{Vp}{\sqrt{d}}$$

and the drain current is increased to $$\frac{Ip}{\sqrt{d}}$$

The peak RF power is equal to $$\frac{Vp}{\sqrt{d}} \cdot \frac{Ip}{\sqrt{d}} \cdot \frac{1}{2}$$

and the average RF power corresponds to $$\frac{Vp * Ip}{\sqrt{2}}.$$

Referring to the graph of FIG. 4, the supplied power during the pulse mode operation is represented by line 100; and the supplied power during operation in the CW mode is represented by line 102. The DC power and the average generated RF power are essentially unchanged between CW and pulsed operation.

Assume that the power supply is sized to generate DC power in support of the pulsed radar duty cycle (typically 0.25). If d were increased to 1 for CW operation, the average DC power drawn would increase by (1/duty) and the power system would be overloaded and would not function. However, in accordance with the present invention, both the drain voltage and the drain current are varied within a predetermined range of duty so that the average RF power output and the average DC power are essentially the same regardless of the duty cycle within such predetermined range as follows:

$d*$(peak drain voltage)*(peak drain current)=constant or $d*Vp*Ip=$ constant

In other words the product of d*Vp*Ip remains the same even though the duty cycle is varied within the predetermined range. Although this could be accomplished by varying either Vp or Ip alone, the efficiency of the device would be decreased. Therefore, both Vp and Ip are scaled so that $$\frac{Vp}{Ip} = Rp$$

where Rp is the load impedance of the device, which in the case of the radiating elements of an antenna, such impedance is considered to remain the same for each of the separate modes.

Thus, Vp and Ip are each controlled to change in proportion to one-half the change of d; which can be expressed as follows:

$$Vp * \frac{Vp}{d} = \text{constant}$$

-continued $$Ip \cdot \frac{Ip}{d} = \text{constant}$$

Under the above described conditions, the average RF power generated by each active aperture remains constant with the variation in duty cycle as does the average DC power drawn from the power supply. This of course assumes that the power supply efficiency is nearly constant regardless of the output voltage, which is characteristic of the preferred pulse width modulated chopper power supply herein. The present invention is also most effective under conditions where the efficiency of the power amplifier 30 is substantially the same for the different voltage and current biasing values. This is dependent to a great extent on the frequencies and the particular devices utilized.

In accordance with the method of the present invention, the power amplifiers are supplied with a voltage Vp and current Ip to support the CW radar mode. In so doing an average power is produced. When a pulsed mode with duty cycle d is desired, the voltage is increased by $$\frac{1}{\sqrt{d}}$$

and the current is increased. Thus, the average RF and DC power are essentially unchanged, and the Average Effective Radiated Power is essentially the same for both modes.

For one application in the pulsed radar mode, with a typical duty cycle of approximately twenty-five percent, optimum power is obtained by controlling the gate bias power supply to achieve 1.0 ampere of peak drain current, and a biasing voltage of approximately ten volts positive to the drains of each power amplifier. For such application in the CW mode, the power supply is regulated to apply a biasing voltage of five volts positive to the drains of each power amplifier; and a gate biasing voltage such as to achieve 0.5 ampere of peak drain current. Such parameters are selected to provide the maximum peak power to the pulsed radar mode, and maximum average power in the CW mode, both in accordance with the average power capacity of the power supply. Such bias switching provides approximately four watts of peak power for each aperture during the pulsed radar mode, and approximately one watt of peak power during the CW mode, which of course provides the same average power for both modes for a pulsed mode with a twenty-five percent duty cycle.

It will be apparent to those skilled in the art that various modifications and variations can be made in the system and method of the present invention without departing from the spirit or scope of the present invention. As an example, other than field effect transistors may be used in the solid state power amplifiers. Thus, it is intended that the present invention cover the modifications and variations of this invention provided they come within the scope of the appended claims and their equivalents.

What we claim is:

1. A dual mode system comprising: a phased array antenna having a plurality of active apertures;
    RF signal generating means connected to apply at least two modes of radiant energy signals to the active apertures, at least two of the at least two modes having different peak power and duty cycle requirements;
    a solid state power amplifier for each of the plurality of active apertures for amplifying the generated RF signals;
    a variable DC power supply for supplying power to each of the power amplifiers;
    mode control means for operating the signal generating means to generate selectively RF signals corresponding to each of the at least two modes;
    power amplifier control means governed by the mode control means for controlling the variable DC power supply to operate each said power amplifier to output RF power having a predetermined first peak amplitude with a predetermined first average effective radiated power during one of the at least two modes, and having a predetermined second peak amplitude different from the first peak amplitude with a second average effective radiated power substantially the same as the first average effective radiated power during another of the at least two modes.

2. The system of claim 1 wherein each power amplifier includes at least one amplifying transistor having a gate, a source, and a drain; and wherein the power amplifier control means comprises:
    first bias control means for controlling the variable DC power supply to bias each said drain with a first voltage and current, with a first predetermined amplitude during one of the at least two modes and with a second predetermined amplitude different from the first predetermined amplitude during the other of the at least two modes; and
    second bias control means for controlling the DC power supply to bias each gate with a second voltage and current, with a first amplitude during one of the at least two modes and with a second amplitude different from the first amplitude during the other of the at least two modes.

3. The system of claim 1 wherein the power amplifier control means includes means for outputting RF power during the one of the at least two modes includes voltage and current, each having an amplitude different from the amplitude during the other of the at least two modes.

4. The system of claim 1 wherein each power amplifier is a class A power amplifier.

5. The system of claim 1 wherein the DC power supply comprises means for generating square wave pulses, and the power amplifier control means includes means for modulating the square wave pulses to determine the power applied to each power amplifier.

6. The system of claim 1 wherein the signal generating means generates radiant energy for one of the at least two modes corresponding to pulsed radar having an approximate twenty-five percent duty cycle and for the other of the at least two modes corresponding to a continuous wave signal.

7. The system of claim 2 wherein the signal generating means generates radiant energy for one of the at least two modes corresponding to pulsed radar having an approximate twenty-five percent duty cycle and for the other of the at least two modes corresponding to a continuous wave signal.

8. The system of claim 2 wherein the second biasing control means applies a voltage to each gate terminal having an amplitude for determining the flow of current in each respective drain terminal.

9. The system of claim 2 wherein the DC power supply comprises means for generating square wave pulses, and the power amplifier control means includes means for modulating the square wave pulses to determine the power applied to each power amplifier.

10. The system of claim 1 wherein each power amplifier is a class A-B power amplifier.

11. A method of optimizing the average effective radiated power of a solid state phased array antenna for both modes of a dual-mode radar system wherein each active aperture includes a power amplifier, the method comprising, applying alternately at least two modes of RF signals to the active apertures, each of the at least two modes having different peak power requirements;

controlling DC power to each power amplifier for operating each power amplifier to output RF power having a predetermined first peak power amplitude with a first average effective radiated power during one of the at least two modes; and controlling the DC power to each power amplifier to operate each power amplifier to output a second peak power amplitude different than the first peak amplitude with a second average effective radiated power substantially the same as the first average effective radiated power during another of the at least two modes.

12. The method of claim 11 wherein each power amplifier includes a source, a drain and a gate electrodes, and wherein the steps of controlling the DC power each include the substeps of biasing each said drain with a first voltage and current having a first predetermined amplitude during one of the at least two modes and having a second predetermined amplitude different from the first predetermined amplitude during another of the at least two modes; and biasing each gate with a second voltage and current, each having a first amplitude during one of the at least two modes and each having a second amplitude different from the first amplitude during the other of the at least two modes.

13. The method of claim 12 wherein the step of controlling the DC power includes chopping the output of the DC source at a rate corresponding to the required amplitude of the biasing voltage and current.

14. A dual mode system comprising:
a phased array antenna having a plurality of active apertures;
RF signal generating means connected to apply two modes of radiant energy signals to the active apertures, each of the two modes having different peak power and duty cycle requirements;
a solid state power amplifier for each of the plurality of active apertures for amplifying the generated RF signals;
a variable DC power supply for supplying power to each of the power amplifiers;
mode control means for operating the signal generating means to generate selectively RF signals corresponding to each of the two modes;
power amplifier control means governed by the mode control means for controlling the variable DC power supply to operate each said power amplifier to output RF power having a predetermined first peak amplitude with a predetermined first average effective radiated power during one of the at least two modes, and having a predetermined second peak amplitude different from the first peak amplitude with a second average effective radiated power substantially the same as the first average effective radiated power during another of the two modes.

15. The system of claim 14 wherein each power amplifier includes at least one amplifying transistor having a gate, a source, and a drain; and wherein the power amplifier control means comprises:

first bias control means for controlling the variable DC power supply to bias each said drain with a first voltage and current, with a first predetermined amplitude during one of the two modes and with a second predetermined amplitude different from the first predetermined amplitude during the other of the two modes; and second bias control means for controlling the DC power supply to bias each gate with a second voltage and current, with a first amplitude during one of the two modes and with a second amplitude different from the first amplitude during the other of the two modes.

16. The system of claim 14 wherein the power amplifier control means includes means for outputting RF power during the one of the two modes includes voltage and current, each having an amplitude different from the amplitude during the other of the two modes.

17. The system of claim 14 wherein each power amplifier is a class A power amplifier.

18. The system of claim 14 wherein the DC power supply comprises means for generating square wave pulses, and the power amplifier control means includes means for modulating the square wave pulses to determine the power applied to each power amplifier.

19. The system of claim 14 wherein the signal generating means generates radiant energy for one of the two modes corresponding to pulsed radar having an approximate twenty-five percent duty cycle and for the other of the two modes corresponding to a continuous wave signal.

20. The system of claim 15 wherein the signal generating means generates radiant energy for one of the two modes corresponding to pulsed radar having an approximate twenty-five percent duty cycle and for the other of the two modes corresponding to a continuous wave signal.

21. The system of claim 15 wherein the second biasing control means applies a voltage to each gate terminal having an amplitude for determining the flow of current in each respective drain terminal.

22. The system of claim 15 wherein the DC power supply comprises means for generating square wave pulses, and the power amplifier control means includes means for modulating the square wave pulses to determine the power applied to each power amplifier.

23. The system of claim 14 wherein each power amplifier is a class A-B power amplifier.

24. A method of optimizing the average effective radiated power of a solid state phased array antenna for both modes of a dual-mode radar system wherein each active aperture includes a power amplifier, the method comprising, applying alternately at least two modes of RF signals to the active apertures, each of the at least two modes having different peak power requirements;

controlling DC power to each power amplifier for operating each power amplifier to output RF power having a predetermined first peak power amplitude with a first average effective radiated power during one of the at least two modes; and controlling the DC power to each power amplifier to operate each power amplifier to output a second peak power amplitude different than the first peak amplitude with a second average effective radiated power substantially the same as the first average effective radiated power during another of the at least two modes.

25. The method of claim 11 wherein each power amplifier includes a source, drain and a gate electrodes, and wherein the steps of controlling the DC power each include the substeps of biasing each said drain with a first voltage and current having a first predetermined amplitude during one of the at least two modes and having a second predetermined amplitude different from the first predetermined amplitude during another of the at least two modes; and biasing each gate with a second voltage and current, each having a first amplitude during one of the at least two modes and each having a second amplitude different from the first amplitude during the other of the at least two modes.

26. The method of claim 12 wherein the step of controlling the DC power includes chopping the output of the DC source at a rate corresponding to the required amplitude of the biasing voltage and current.

* * * * *